US005266382A

United States Patent [19]

Tuyuguchi et al.

[11] Patent Number: 5,266,382

[45] Date of Patent: Nov. 30, 1993

[54] THERMAL TRANSFER RECORDING MEDIUM

[75] Inventors: Hiromi Tuyuguchi; Kazuo Miyai; Akio Shimomine, all of Osaka, Japan

[73] Assignee: Fujicopian Co., Ltd., Osaka, Japan

[21] Appl. No.: 834,762

[22] Filed: Feb. 13, 1992

[30] Foreign Application Priority Data

Feb. 14, 1991 [JP] Japan ................................ 3-020953

[51] Int. Cl.$^5$ ................................................ B32B 3/00

[52] U.S. Cl. .................................... 428/195; 428/206; 428/323; 428/331; 428/447; 428/484; 428/488.1; 428/913

[58] Field of Search ............... 428/195, 206, 323, 331, 428/447, 484, 488.1

[56] References Cited

U.S. PATENT DOCUMENTS 4,840,848 6/1989 Koshizuka et al. ................ 428/413

FOREIGN PATENT DOCUMENTS 0163145 12/1985 European Pat. Off. .
0210838 2/1987 European Pat. Off. .
2646809 11/1990 France .
2-3392 1/1990 Japan .

*Primary Examiner*—Patrick J. Ryan
*Assistant Examiner*—Elizabeth Evans
*Attorney, Agent, or Firm*—Armstrong, Westerman, Hattori, McLeland & Naughton

[57] ABSTRACT

A thermal transfer recording medium comprising a foundation and a thermal transfer ink layer provided thereon, said thermal transfer ink layer containing the particles of a silicone compound. The recording medium gives print images having excellent scratch or abrasion resistance without any deterioration in clearness of print image. The recording medium of self-correctable type gives print images which can be corrected clearly by a self-correction method.

6 Claims, No Drawings

THERMAL TRANSFER RECORDING MEDIUM

BACKGROUND OF THE INVENTION

The present invention relates to a thermal transfer recording medium.

Heretofore, various kinds of thermal transfer recording media have been used in a variety of printing apparatuses. However, in the case of thermal transfer recording media for bar code printing, label printing and rough paper printing wherein the main object of printing is papers having a poor surface smoothness, and a thermal transfer recording medium of correctable type which gives correctable print images, among the above-mentioned thermal transfer recording media, the problem that print images are insufficient in durability such as scratch resistance or abrasion resistance is encountered.

For instance, when a printed matter obtained by using these conventional recording media is passed through a facsimile machine, the print image is rubbed with a sliding member provided inside the machine, so that the print image, in some cases, is peeled partially or scratches occur in the print image. In the case of a printed matter obtained by printing on a rough paper having a Bekk smoothness of about 20 seconds, the print image, in some cases, becomes unclear merely by rubbing the surface of the printed matter with the finger, etc. In the case of a printed matter obtained by using the conventional correctable recording medium, even the image printed on a smooth paper is not necessarily sufficient in scratch or abrasion resistance. Further, a printed matter obtained by using the conventional recording medium for bar code printing does not necessarily satisfy the essential requirement for bar code that even though the image surface is rubbed a little, the image is not damaged and can be accurately read.

Various attempts were made to improve the durability of print image. However, when the durability of print image is improved, there occur the problem that the selective transferability of the ink layer becomes poor so that the quality of the obtained image is poor, and another problem that the quality of correction of erroneous print image, which means the appearance quality of the trace of the erroneous print image removed from the receiving paper, is poor. Herein, the term "selective transferability" means that only the portion of the ink layer heated with a heating element is sharply separated from the remaining portions of the ink layer and transferred to a receiving paper to give an ink dot having substantially the same shape as that of the heating element. Thus, there has not been obtained any thermal transfer recording medium satisfying both the durability and the quality of print image.

An object of the present invention is to provide a thermal transfer recording medium capable of giving print images having an excellent durability without any deterioration in the quality of the print images and the quality of correction.

This and other objects of the invention will become apparent from the description hereinafter.

SUMMARY OF THE INVENTION

The present invention provides a thermal transfer recording medium comprising a foundation and a thermal transfer ink layer provided thereon, said thermal transfer ink layer containing the particles of a silicone compound.

The present invention has been completed on the basis of the novel finding that when the particles of a silicone compound are contained in the thermal transfer ink layer of a thermal transfer recording medium, the durability of the print image can be improved without any deterioration in the quality of the print image or any deterioration in the quality of correction in the case of the correctable recording medium.

The reason why the scratch resistance or the abrasion resistance of the print image is improved by incorporating the silicone compound particles into the thermal transfer ink layer is not necessarily definite but presumed as follows: (1) Since the coefficient of friction of the surface of the obtained print image is lowered, the frictional drag generated when the surface of the print image is rubbed is reduced. (2) When another article is pressed against the print image on the receiving paper under an elevated pressure and removed therefrom, there is no case that the image sticks to the article and is peeled off from the receiving paper because the stickiness of the print image is reduced.

DETAILED DESCRIPTION

The thermal transfer recording medium of the present invention is obtained, for example, by applying an ink prepared by dispersing the particles of a silicone compound and a coloring agent, and if necessary, another component, into a heat meltable vehicle or a vehicle capable of being softened upon heating, onto a foundation by means of a solvent coating method or a hot melt coating method, thereby forming a thermal transfer ink layer on the foundation.

The silicone compound contained in the form of particles in the thermal transfer ink layer includes solid organopolysiloxanes or silicone polymers, for example, silicone resins and silicone rubbers. Silicone compound particles which are not melted or softened at the thermal transfer temperature are suitable.

Silicone waxes can also be used as the silicone compound. The silicone wax is usually a compound wherein siloxane group is bonded to a wax-like substance. In the case of using the silicone wax, usually, the particles thereof are formed in the ink layer from a mixture of the silicone wax and the vehicle by phase separation.

The average particle size of the silicone compound particles is preferably from 0.5 to 5 μm, more preferably from 0.8 to 4.5 μm. When the average particle size is less than the above range, the effect of improving the durability of print image tends to be poor. When the average particle size is more than the above range, the transferability of the ink layer tends to be ruined.

The silicone compound particles may be either those in a spherical form or a form similar thereto, or those in an indeterminate form, for example, which are obtained by pulverizing large silicone compound particles to give particles having a desired particle size. The particle size distribution may be either in a monodispersed one or in a polydispersed one having some distribution in particle size within the above range.

The silicone compound particles are preferably incorporated in an amount of 4 to 12% (% by weight, hereinafter the same) on the basis of the total amount of the solid components of the thermal transfer ink layer. When the amount of the silicone compound particles is less than the above range, the effect of improving the durability of print image is insufficient. When the amount of the silicone compound particles is more than the above range, both the adhesiveness of the ink to a receiving medium and the adhesiveness of the ink to the foundation are lowered.

As the vehicle, there can be employed those used for various kinds of conventional thermal transfer ink layers, for example, a thermal transfer ink layer for one-time use, a thermal transfer ink layer for a correctable recording medium and a thermal transfer ink layer for a self-correctable recording medium. The correctable recording medium is one capable of giving print images removable from the receiving paper by an appropriate method, for example, a method wherein the print image on the receiving paper is heated with a heating means such as a heating head while interposing between the print image and the heating means a removing means (lift-off means) such as a film assuming an adhesiveness against the print image upon heating or an adhesive tape and the removing means is separated from the receiving paper, whereby the print image is removed from the receiving paper together with the removing means. The self-correctable recording medium is a kind of the correctable recording medium which itself has a function of the removing means in the above-mentioned method.

The vehicle is composed of a wax-like substance and/or a thermoplastic resin. Examples of the wax-like substance include paraffin type waxes such as paraffin wax, microcrystalline wax and polyethylene wax; natural waxes such as haze wax, bees wax, carnauba wax and ceresin wax; synthetic waxes such as oxidized wax and ester wax; and higher fatty acids and the esters thereof. Examples of the thermoplastic resin include vinyl chloride-vinyl acetate copolymer, ethylene-vinyl acetate copolymer, vinyl chloride-vinyl acetate-maleic acid terpolymer, polyvinylbutyral, styrene-butadiene copolymer, α-olefin-maleic anhydride copolymer and petroleum resins. These materials may be used singly or in admixture.

As the coloring agent, there can be used a variety of pigments and dyes conventionally used as the coloring agent for the heat meltable transfer ink, and magnetic powders, metal powder and fluoresent pigments and dyes. The content of the coloring agent is preferably from about 1 to about 50%, more preferably from about 3 to about 18%, on the basis of the total amount of the solid components of the ink layer.

The thermal transfer ink is prepared, for example, by uniformly dispersing the above silicone compound particles and coloring agent into the above vehicle. The ink preferably has a melting or softening temperature of from about 50° to about 200° C., especially from about 80° to about 120° C., and a melt viscosity (measured at a temperature by 10° C. higher than the melting or softening temperature of the ink by means of a rheometer made by Rheology Co., Ltd., hereinafter the same) of about 50 to about $2\times10^3$ cps for the ink for one-time use, of about 50 to about $5\times10^6$ cps, particularly about $2\times10^2$ to about $5\times10^6$ cps for the correctable ink, and of about $1\times10^5$ to about $5\times10^6$ cps for the self-correctable ink. The coating amount of the ink is preferably from 2 to 8 $g/m^2$ (solid basis) for every type of the above-mentioned inks.

The vehicle for the correctable or self-correctable ink is preferably composed of predominantly a thermoplastic resin, and if necessary, a minor amount of a wax-like substance.

In the case of the correctable recording medium including self-correctable recording medium among the thermal transfer recording media of the present invention, it is preferable to provide a release layer between the foundation and the thermal transfer ink layer. The release layer is used to facilitate the separation of the ink from the foundation in printing. Usually the release layer is composed predominantly of a wax-like substance, and optionally a minor amount of a thermoplastic resin. The wax-like substance and the thermoplastic resin can be selected from the wax-like substances and thermoplastic resins used as the vehicle of the above-mentioned thermal transfer ink layer.

The release layer is formed by applying a solution or dispersion of the above material in a solvent (including single solvent or mixed solvent) onto a foundation, followed by drying, or by applying the above material by means of hot-melt coating. The coating amount of the release layer is preferably from about 1 to about 2 $g/m^2$ (solid basis).

A variety of plastic films generally used as a foundation film for this type of ink ribbon, including polyester films such as polyethylene terephthalate film, polycarbonate films, polyamide films and others, can be used as the foundation in the present invention. High density thin papers such as condenser paper can also be used as the foundation. In the case of using such plastic films, there may be provided on the rear surface of the foundation (the surface in sliding contact with the heating head) a conventional stick preventing layer composed of one or more of various lubricative heat-resistant resins such as silicone resin, fluorine-containing resin and nitrocellulose, other resins modified with the foregoing lubricative heat resistant resins, and mixtures of the foregoing resins with lubricating agents, in order to prevent the foundation from sticking to the heating head. The thickness of the foundation is preferably from about 2 to about 10 μm, more preferably from about 3 to about 7 μm from the viewpoint of good heat conductin.

The print images obtained by using the thermal transfer recording medium have excellent scratch or abrasion resistance as well as excellent clearness, regardless of the kind of receiving media including rough paper and smooth paper. In the case of the print images obtained from the correctable recording medium, the quality of correction is also excellent.

The thermal transfer recording medium of the present invention gives print images having excellent scratch or abrasion resistance without any deterioration in clearness of image and quality of correction. Thus the recording medium of the present invention is useful as thermal transfer ink ribbons used in a variety of thermal printers and typewriters.

The present invention is more specifically described and explained by means of the following Examples. It is to be understood that the present invention is not limited to the Examples, and various changes and modifications may be made in the invention without departing from the spirit and scope thereof.

EXAMPLE 1

Onto the front surface of polyethylene terephthalate film having a thickness of 6 μm provided with a stick-preventing layer having a coating amount of 0.05 $g/m^2$ composed of a silicone-modified urethane resin on the rear surface thereof was applied each ink for release layer having the formula shown in Table 1 and dried to give a release layer. Then, each colored ink having the formula shown in Table 1 was applied onto the release layer and dried to give a thermal transfer ink layer, thereby yielding a thermal transfer recording medium of self-correctable type. The recording medium was slit to give ink ribbons.

The following properties were evaluated with respect to each of the sample ribbons obtained above.

SCRATCH RESISTANCE

Employing each sample ribbon, printing was conducted on a plain paper having a Bekk smoothness of 50 seconds by means of a thermal transfer printer (commercially available under the name "EDITOR 100", made by Olivetti & Co). The obtained printed matter was passed through a facsimile machine (commercially available under the name "Canofax 1020", made by CANON INC.) within five minutes after the printing. The degree of shaving of the print image was observed by the naked eye and ranked as follows:

A: The image was not shaved at all.

B: A part of the image was shaved but the image was readable.

C: A part of the image was shaved so that it was difficult to read the image.

D: A half or more part of the image was shaved so that it was impossible to read the image.

CLEARNESS OF PRINT IMAGE

Employing each sample ribbon, one-dot printing was conducted on a plain paper having a Bekk smoothness of 50 seconds by means of a thermal transfer printer (commercially available under the name "U1Pro 503AI", made by Matsushita Electric Industrial Co., Ltd.). The ratio of the area of one dot of the ink actually printed to the area of one dot of the heating element was determined and ranked as follows:

A: Area ratio . . . 0.90 to 1.10

B: Area ratio . . . not less than 0.70, less than 0.90

C: Area ratio . . . less than 0.70

QUALITY OF SELF-CORRECTION

Employing each sample ribbon, printing was conducted on a plain paper having a Bekk smoothness of 50 seconds by means of a thermal transfer printer provided with the function of self-correction (commercially available under the name "EDITOR 100", made by Olivetti & Co.). The erroneous print letter was removed from the paper by using the same printer and the same ink ribbon. The appearance of the trace of the removed erroneous print letter was observed by the naked eye and ranked as follows:

A: The erroneous print letter was removed without leaving any trace.

B: A slight trace of the erroneous print letter was observed but there was no practical problem.

C: A considerable trace of the erroneous print letter was observed and the correction was insufficient.

The results of the above tests are shown in Table 1.

TABLE 1

| Run No. | 1 | 2 | 3 | 4 | 5 |
|---|---|---|---|---|---|
| Release layer Formula (part by weight) | | | | | |
| Paraffin wax | 10 | 10 | 10 | 10 | 10 |
| Toluene | 54 | 54 | 54 | 54 | 54 |
| Methyl alcohol | 36 | 36 | 36 | 36 | 36 |
| Coating amount (solid basis, g/m$^2$) | 1.5 | 1.5 | 1.5 | 1.5 | 1.5 |
| Thermal transfer ink layer Formula (part by weight) | | | | | |
| Ethylene-vinyl acetate copolymer | 11 | 11 | 11 | 11 | 11 |
| Petroteum resin | 4 | 4 | 4 | 4 | 4 |
| Silicone compound particles* | 0 | 0.8 | 1.7 | 2.6 | 3.4 |
| Carbon black | 4 | 4 | 4 | 4 | 4 |
| Toluene | 79.3 | 79.3 | 79.3 | 79.3 | 79.3 |
| Content of silicone compound particles in the ink layer (%) | 0 | 4.0 | 8.0 | 12.0 | 15.0 |
| Coating amount (solid basis, g/m$^2$) | 6 | 6 | 6 | 6 | 6 |
| Melt viscosity (cps at 90° C.) | $2 \times 10^6$ | $2 \times 10^6$ | $2 \times 10^6$ | $2 \times 10^6$ | $2 \times 10^6$ |
| Evaluation | | | | | |
| Scratch resistance | D | B | A | A | C |
| Clearness of print iage | A | A | A | A | B |
| Quality of self-correction | B | A | A | A | A |

*Spherical silicone resin particles having an average particle size of 1 μm. commercially available under the name "Silica Microbeads P1500", made by NIPPON SHOKUBAI., LTD.

EXAMPLE 2

Onto the front surface of polyethylene terephthalate film having a thickness of 4.5 μm provided with a stick-preventing layer having a coating amount of 0.05 g/m$^2$ composed of a silicone-modified urethane resin on the rear surface thereof was applied each colored ink having the formula shown in Table 2 by hot-melt coating to give a thermal transfer recording medium for bar code. The recording medium was slit to give ink ribbons.

The following property was evaluated with respect to each of the sample ribbons obtained above.

ABRASION RESISTANCE

Employing each sample ribbon, printing was conducted on a plain paper having a Bekk smoothness of 50 seconds by means of the above-mentioned thermal transfer printer, U1Pro 503AI. A rubber eraser was placed on the print image on the paper and the print image was rubbed with the eraser by reciprocating it 10 times under a load of 50 grf/cm$^2$ by means of a crock meter. The degree of shaving of the print image was observed by the naked eye and ranked as follows:

A: The image was not shaved at all.

B: A part of the image was shaved but the image was readable.

C: A part of the image was shaved so that it was difficult to read the image.

D: A half or more part of the image was shaved so that it was impossible to read the image.

The results are shown in Table 2.

TABLE 2

| Run No. | 1 | 2 | 3 | 4 | 5 |
|---|---|---|---|---|---|
| Thermal transfer ink layer Formula (part by weight) | | | | | |
| Ethylene-vinyl acetate copolymer | 10 | 10 | 10 | 10 | 10 |
| Polyethylene wax | 62 | 62 | 62 | 62 | 62 |
| Oxidized wax | 5 | 5 | 5 | 5 | 5 |
| Silicone compound particles* | 0 | 3.8 | 8.0 | 12.5 | 16.2 |
| Carbon black | 15 | 15 | 15 | 15 | 15 |
| Content of silicone compound particles in the ink layer (%) | 0 | 4.0 | 8.0 | 12.0 | 15.0 |
| Coating amount (solid basis, g/m$^2$) | 3 | 3 | 3 | 3 | 3 |
| Melting temperature (°C.) | 80 | 80 | 80 | 80 | 80 |
| Melt viscosity (cps at 90° C.) | $3 \times 10^2$ | $3 \times 10^2$ | $3 \times 10^2$ | $3 \times 10^2$ | $3 \times 10^2$ |
| Evaluation | | | | | |
| Abrasion resistance | C | A | A | B | C |

*Silicone resin powder having an average particle size of 0.8 μm, commercially available under the name "TOSPERL 108", made by TOSHIBA CORPORATION.

The results of Table 1 and Table 2 reveal that the thermal transfer recording media having a thermal transfer ink layer wherein the particles of a silicone compound are contained in an amount of 4 to 12% on the basis of the total amount of the solid components give print images having excellent scratch resistance and abrasion resistance without any deterioration in the clearness of print image and the quality of correction.

In addition to the materials and ingredients used in the Examples, other materials and ingredients can be used in the Examples as set forth in the specification to obtain substantially the same results.

What we claim is:

1. A thermal transfer recording medium comprising a foundation and a thermal transfer ink layer provided thereon, said thermal transfer ink layer containing particles of a silicone compound which are neither melted nor softened at a thermal transfer temperature, wherein the thermal transfer ink layer is capable of providing print images removable by a self-correction method when the ink layer is transferred to a receiving medium.

2. The thermal transfer recording medium of claim 1, wherein the average particle size of the silicone compound particles is from 0.5 to 5 μm.

3. The thermal transfer recording medium of claim 1, wherein the content of the silicone compound particles in the thermal transfer ink layer is from 4 to 12% by weight.

4. A thermal transfer recording medium comprising a foundation and a thermal transfer ink layer provided thereon, said thermal transfer ink layer having a melt viscosity of about $1\times10^5$ to about $5\times10^6$ cps at a temperature by 10° C. higher than the melting or softening temperature of the thermal transfer ink layer and containing particles of a silicone compound which are neither melted nor softened at a thermal transfer temperature, wherein the thermal transfer ink layer is capable of providing print images removable by a self-correction method when the ink layer is transferred to a receiving medium.

5. The thermal transfer recording medium of claim 4, wherein the average particle size of the silicone compound particles is from 0.5 to 5 μm.

6. The thermal transfer recording medium of claim 4, wherein the content of the silicone compound particles in the thermal transfer ink layer is from 4 to 12% by weight.

* * * * *